United States Patent Office 3,430,048
Patented Feb. 25, 1969

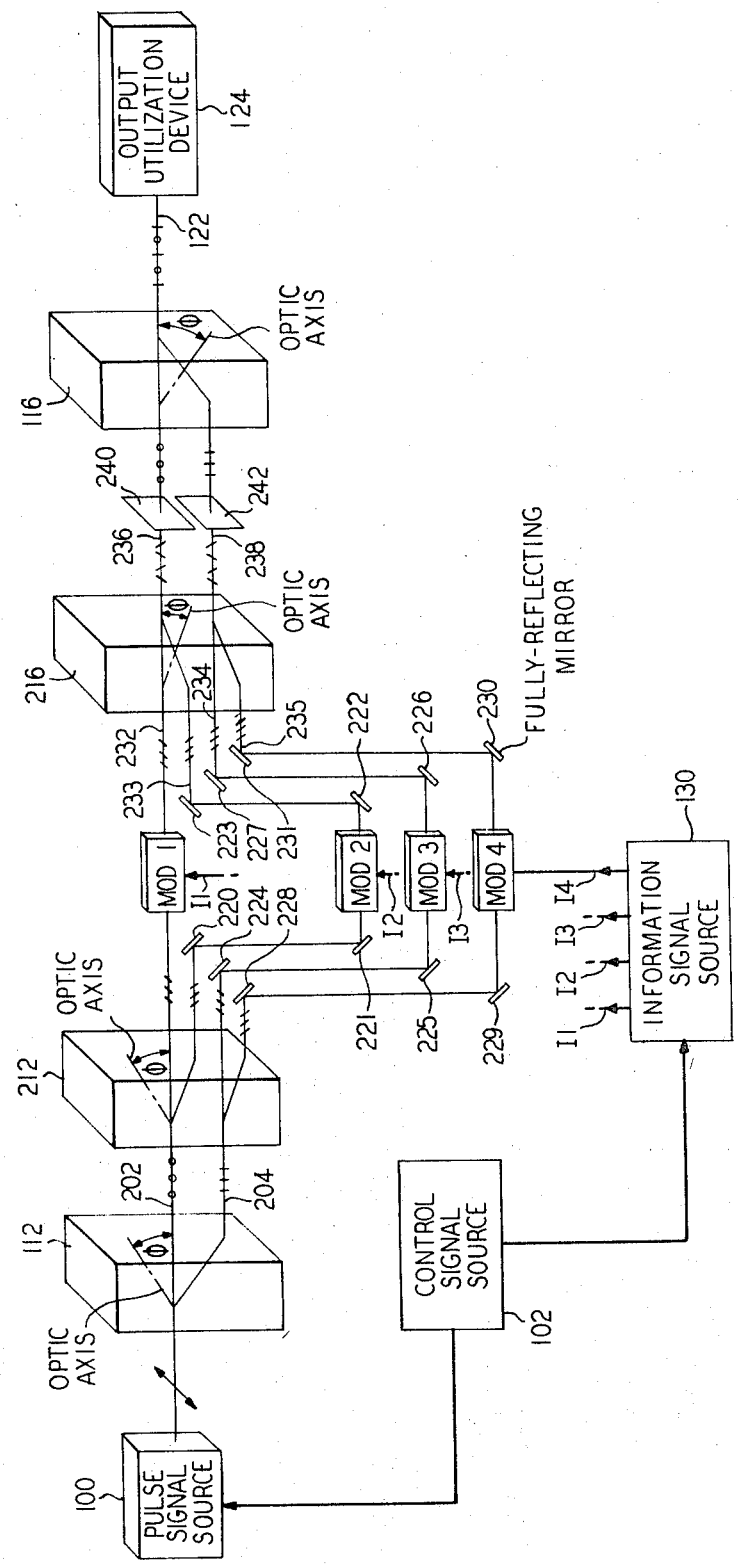

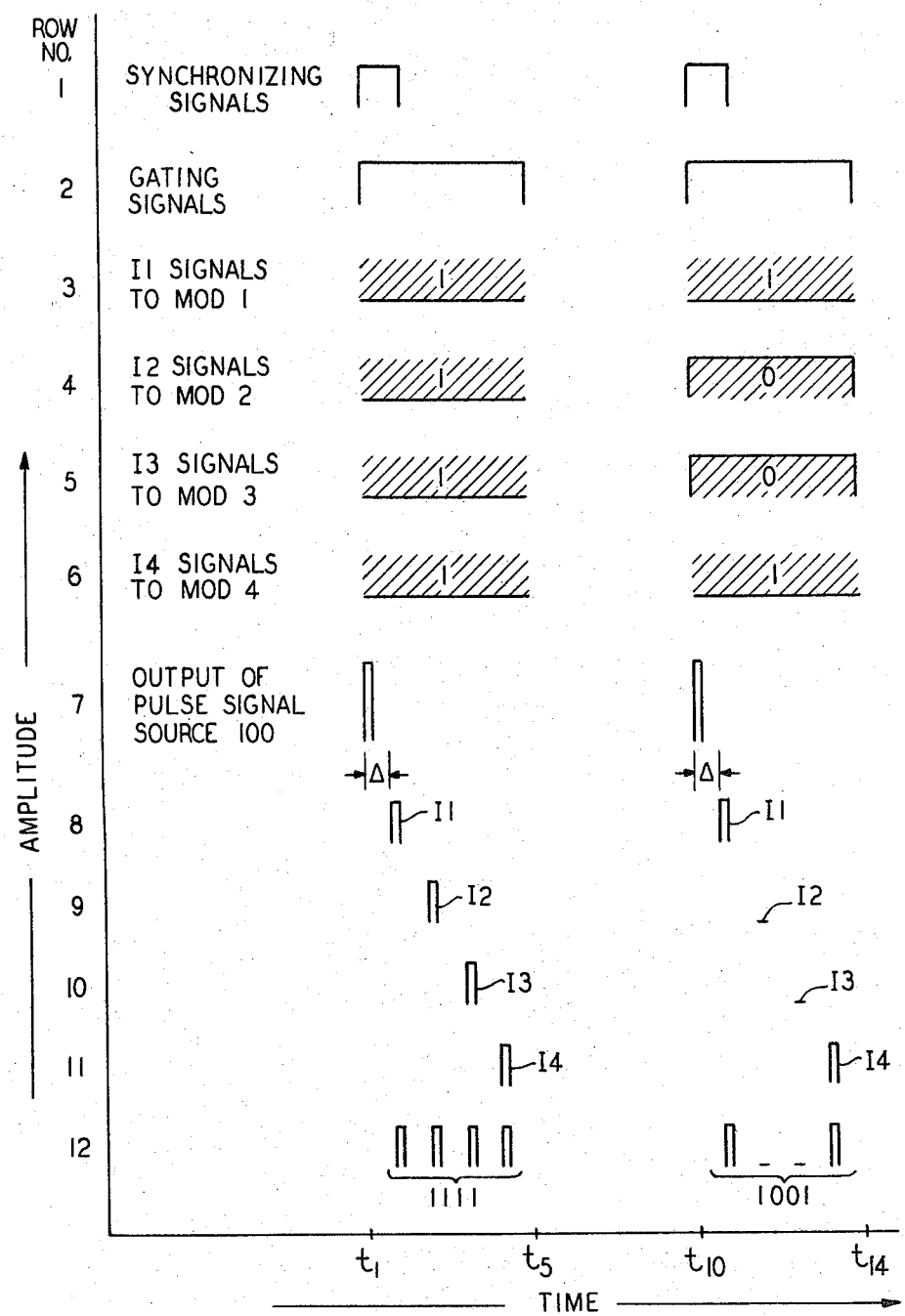

3,430,048
OPTICAL PULSE GENERATOR
Charles B. Rubinstein, Morristown, N.J., assignor to Bell
Telephone Laboratories Incorporated, New York, N.Y.,
a corporation of New York
Filed Dec. 17, 1965, Ser. No. 514,628
U.S. Cl. 250—199                                8 Claims
Int. Cl. H04b 9/00

ABSTRACT OF THE DISCLOSURE

A laser pulse generator for increasing the information-handling capacity of pulsed systems having wide interpulse intervals is disclosed. A single pulse from a laser source is directed to a pulse-splitting device where the pulse is split into two pulses, each of which traverses a different optical-length path to a pulse-recombining device. The pulses are then recombined to form a multiple sequential output signal. The output from the recombining device is thus formed by the pulse traversing the shorter length path followed by the pulse traversing the longer length path. Modulators interposed in the individual paths before recombination of the pulses impose information on the pulses as they traverse those paths.

---

This invention relates to signal translating and more particularly to an arrangement for generating pulses suitable for use in an optical information processing system.

It is known to operate a laser in a mode wherein the output thereof comprises a series of very narrow pulses that are relatively widely spaced apart. In particular, the output pulses of one specific illustrative such laser are each characterized by a width of approximately 0.5 nanosecond. The pulse period of this specific laser is about 10 nanoseconds. L. E. Hargrove application Ser. No. 362,319, filed Apr. 24, 1964, describes a pulsed laser of this general type.

The information-handling capacity per unit time of a system that is designed to process narrow nanosecond pulses can be significantly increased if the pulse train output of a Hargrove-type laser is modified. Specifically, the information-handling capacity of the pulsed output thereof can be increased by generating a plurality of additional pulses during the aforenoted relatively wide interpulse interval. In turn, the plural optical pulses generated in response to each single signal supplied by the laser are adapted to be processed by arrangements such as optical transmission lines and memories.

An object of the present invention is the improvement of optical signal processing systems.

More specifically, an object of this invention is an arrangement for generating a pulse train suitable for efficient use in an optical information signal processing system.

Another object of the present invention is a reliable optical pulse generator that is characterized by simplicity of design, compactness and ease of fabrication.

These and other objects of the present invention are realized in a specific illustrative embodiment thereof that includes first and second spaced-apart birefringent elements. An input optical pulse which is plane polarized in a preselected manner with respect to the plane containing the optic axis and the normal to the incident surface of the first element, is directed at the first element. Because of the preselected orientation, the incident pulse is split by the first element into two equal-amplitude pulses that are propagated along spatially distinct modulation paths.

Each modulation path includes a modulator unit whose energization state is determinative of whether or not the pulse propagated therethrough is directed by the second element to an output utilization device. In addition, one of the paths includes a fully reflecting mirror assembly that is adapted in effect to selectively increase the optical length of the one path, whereby the total lengths of the spatially distinct paths traversed by pulses in propagating between the elements are respectively different.

In particular, the lengths of the spatially distinct paths are so proportioned that each pulse of a pair that passes between the first and second elements reaches the second element in a different one of two spaced time slots. In turn, the second element is so oriented with respect to the first element that the spaced-apart pulses incident thereon are routed in an interleaved fashion to appear on a single output path that extends to the utilization device.

As a result, the embodiment responds to a single applied input pulse to produce a serial output stream of two equal-amplitude pulses (or no pulses). Whether or not an output pulse appears in its associated time slot in the stream is a function of the energization condition of the modulator unit associated with the pulse.

In further accord with the principles of the present invention, $n$ additional pairs of birefringent elements may be combined with the illustrative embodiment to extend the splitting and recombining action thereof to the case wherein $2^{n+1}$ spaced equal-amplitude output pulses are generated in response to each input pulse.

It is a feature of the present invention that an optical pulse generator include at least one pair of spaced-apart birefringent elements responsive to a single input optical pulse for generating a plurality of equal-amplitude output pulses.

It is another feature of this invention that the elements of each pair be oriented with respect to each other so that one element splits an optical pulse incident thereon into two equal-amplitude pulses which are respectively propagated along a pair of spatially distinct paths and so that the other element combines the pulses directed thereat into a single serial pulse train along one spatial path.

It is a further feature of the present invention that each split pulse be directed along a modulation channel that includes an optical modulator unit, whereby the state of each such unit determines whether or not the pulse propagated therealong is eventually routed to an output utilization device.

It is still another feature of this invention that the total lengths of the respective paths traversed by pulses in reaching the output utilization device be different, so that any pulses directed to the device arrive thereat in spaced-apart sequence.

A complete understanding of the present invention and of the above and other objects, features and advantages thereof may be gained from a consideration of the following detailed description of two specific illustrative embodiments thereof presented hereinbelow in connection with the accompanying drawing, in which:

FIG. 2 depicts another illustrative arrangement which embodies the principles of this invention; and FIG. 3 shows various waveforms representative of the mode of operation of the arrangement shown in FIG. 2 for amplitude modulation.

Figure 1:
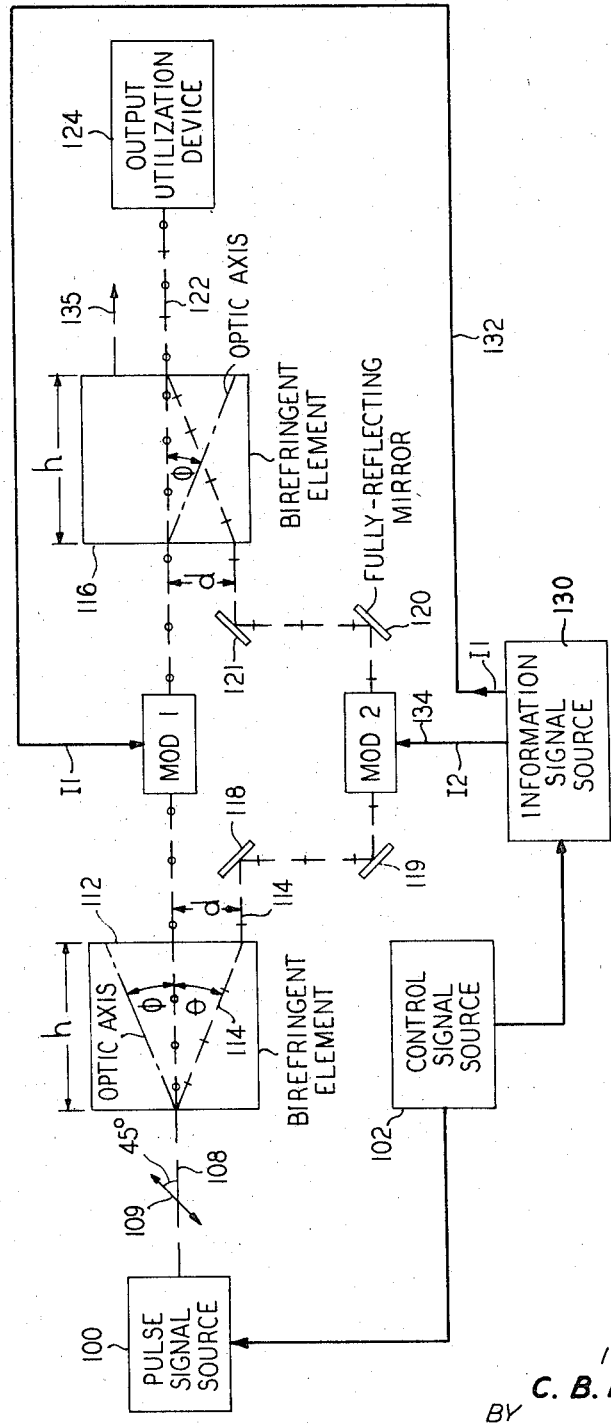
FIG. 1 shows a specific illustrative optical pulse generating arrangement made in accordance with the principles of the present invention.

The arrangement of FIG. 1 includes a pulse signal source 100 which may, for example, comprise a pulsed laser of the type described in the aforecited Hargrove application. Synchronizing signals are applied to the source 100 from a control signal source 102. In response to each such synchronizing signal (represented in row No. 1 of FIG. 3) the source 100 emits a narrow pulse of electromagnetic energy of the general form shown in row No. 7 of FIG. 3.

Advantageously the pulse emitted by the source 100 of FIG. 1 comprises a narrow burst of light that is plane polarized at an angle of 45 degrees with respect to the plane of FIG. 1. The propagation vector of the optical pulse that emerges from the source 100 is directed along a dashed-line path that is coincident with the main axis or horizontal reference line 108 of the FIG. 1 arrangement. The 45-degree plane-polarized condition of this emitted pulse is represented in FIG. 1 by a double-headed arrow 109.

The propagation vector of the pulse supplied by the source 100 is oriented normal to the left-hand or entry face of a cuboidal birefringent element 112 which may, for example, be made of calcite. The element 112 is positioned such that its optic axis is in the plane of FIG. 1 and disposed at an angle $\phi$ with respect to the reference line 108. As a result of the particular depicted orientation of the polarization of the incident pulse relative to the optic axis of the element 112, the incident pulse undergoes what is referred to in the art as double refraction. Specifically, one-half of the incident pulse energy follows an ordinary ray path which is coincident with the horizontal reference line 108. The other half of the incident pulse energy is refracted and follows an extraordinary ray path 114. These two equal reduced-amplitude pulses emerge from the right-hand or exit face of the element 112 and initially propagate along parallel spatially distinct optical paths.

The double refraction of the optical beam directed at the element 112 provides two output beams of equal intensity having polarization directions orthogonal to one another. These two orthogonal directions are respectively represented by circles along the ordinary ray path and by short line segments perpendicular to the extraordinary path. The circles are intended to indicate that the beam propagated along the ordinary ray path is plane-polarized perpendicular to the plane of FIG. 1, whereas the short line segments represent plane polarization in the plane of FIG. 1.

The 45-degree plane-polarized pulse that is directed at the element 112 may be considered to comprise two orthogonally disposed components. One such component is polarized in a plane perpendicular to the plane of FIG. 1. This component gives rise to the ordinary ray pulse. The other component is plane polarized in the plane of FIG. 1. The extraordinary ray pulse is derived from this second component. It is noted that this second component is refracted by the element 112 through an angle $\theta$ from the line 108 to make an angle $\phi+\theta$ with the optic axis. Subsequently, in emerging from the right hand face of the element 112, the extraordinary ray is refracted upward by the angle $\theta$ thereby to propagate along a line that is parallel to the horizontal reference line 108.

The displacement or separation between the propagation vectors of the two pulses that emerge from the birefringent element 112 is designated in FIG. 1 by the letter $d$. Advantageously the angle $\phi$ is chosen so as to maximize the separation $d$. In such a case, the separation is given by the expression:

$$d\left(\frac{n_o^2 - n_e^2}{2n_o^2 n_e^2}\right)h$$

where $n_o$ and $n_e$ are the indices of refraction for the ordinary and extraordinary rays, respectively, and $h$ is the width of the element 112.

The ordinary ray pulse follows a straight line path through a modulator unit MOD 1 to a second birefringent element 116. On the other hand, the extraordinary ray pulse is routed along a relatively long circuitous optical path by four conventional fully reflecting mirrors 118 through 121. This second-mentioned path includes a modulator unit MOD 2. Thus, it is apparent that each of the two modulation paths or channels between the elements 112 and 116 is characterized by a different path length. The lengths of these paths are so proportioned that the pulses respectively propagated therealong arrive at the element 116 in spaced-apart sequence.

Illustratively, each of the two modulator units MOD 1 and MOD 2 shown in FIG. 1 comprises an element of potassium dihydrogen phosphate (KDP). By applying respective electrical control signals to such modulator units, the conditions of the units may be selectively controlled to determine whether or not pulses propagated therethrough are eventually routed by the element 116 to an output path 122 and an output utilization device 124. The modulator units MOD 1 and MOD 2 are, for example, controlled by electrical information signals I1 and I2 supplied thereto from an information signal source 130 in response to the application to the source 130 of a gating signal from the control source 102. These information signals are respectively applied to the units MOD 1 and MOD 2 via two electrical leads 132 and 134.

The second birefringent element 116 is oriented in what is referred to herein as a complementary-disposed position with respect to the first element 112. In accordance with that disposition, the optic axis of the element 116 is in the plane of FIG. 1 but rotated clockwise therein through an angle $2\phi$ with respect to the optic axis of the element 112. In other words, relative to the orientation of the element 112, the element 116 is rotated 180 degrees about the normal to the left-hand or entry face thereof.

The ordinary ray pulse incident on the element 116 proceeds straight through that element along the horizontal reference line 108. However, the extraordinary ray pulse is refracted by the element 116 through an angle $\theta$ from the horizontal to make an angle $\theta+\phi$ with the optic axis. Subsequently, in emerging from the right hand face of the element 116, the extraordinary ray pulse is refracted downward through the angle $\theta$, thereby propagating along the horizontal reference line 108 which is coincident with the output path 122. In other words, both the ordinary and extraordinary ray pulses are routed by the element 116 to the single output path 122 and thence to the output utilization device 124. As described above, these pulses arrive at the element 116 in spaced-apart sequences. Similarly, after being combined by the element 116, the pulses appear on the path 122 and are delivered to the device 124 in a time-spaced manner. Thus, neglecting for the moment the action of the modulator units MOD 1 and MOD 2, there are supplied to the output device 124 two spaced pulses, each of one-half unit amplitude, in response to each unit-amplitude pulse emitted by the source 100.

If the modulator units MOD 1 and MOD 2 shown in FIG. 1 are not energized or activated by the information signal source 130, the operation of the illustrative embodiment is as described above. That is, in response to each input pulse, two output pulses are provided. Assume, however, that for example an electrical control potential (indicative of a "0" information signal) is applied to the modulator unit MOD 1 from the source 130 during the time interval in which an optical pulse traverses the unit MOD 1. Illustratively, the effect of so activating the unit MOD 1 is to cause the polarization condition of the pulse propagated therethrough to be alerted. In particular, the polarization condition of the pulse may be altered to correspond to that of the extraordinary ray pulse propagated between the elements 112 and 116. As a result of such an alteration, the pulse propagated along the horizontal reference line 108 to impinge upon the element 116 is not directed straight through the element 116 to the device 124. Instead, the pulse is refracted upward within the element 116 and is eventually routed thereby along an alternative horizontal path 135. The pulse propagated along the path 135 is not delivered to the device 124. Under such circumstances, the device 124 would detect a no-pulse or "0" condition during the time slot assigned to the ordinary ray pulse.

In accordance with the principles of the present invention, an incident optical pulse is split and then recombined along a single spatial path to form a two-pulse serial train. By adding $n$ additional pairs of suitably positioned birefringent elements to the basic arrangement shown in FIG. 1, it is feasible to split the incident pulse into $2^{n+1}$ reduced-amplitude output pulses. The presence or absence of each such pulse (or some other suitable modulated characteristic thereof—such as phase or frequency) can be selectively controlled by passing the pulses through a respective plurality of modulator units.

FIG. 2 depicts an illustrative embodiment which includes two pairs of birefringent elements. Some of the components of the FIG. 2 arrangement are identical to those shown in FIG. 1. Such components are identified in FIG. 2 by the same reference numerals employed therefor in FIG. 1.

As in the FIG. 1 embodiment, the optical pulse emitted by the source 100 of FIG. 2 is assumed to be plane-polarized at an angle of 45 degrees. The first or leftmost birefringent element 112 of FIG. 2 is identical to the correspondingly numbered element in FIG. 1. As a result, the pulse directed at the element 112 of FIG. 2 is split into two equal-amplitude orthogonally polarized pulses which are respectively propagated along two parallel paths 202 and 204.

In FIG. 2 a second birefringent element 212 is oriented such that its optic axis and the normal to the left-hand or entry surface thereof define a plane that makes an angle of 45 degrees with respect to the two polarizations characteristic of the pulses respectively propagated along the paths 202 and 204. As indicated in FIG. 2, the optic axis of the element 212 makes an angle $\phi$ with respect to the normal to the entry surface thereof.

The two input pulses respectively directed at the element 212 along the paths 202 and 204 of FIG. 2 are thus polarized with respect to the orientation of the element 212 such that each incident pulse splits into equal-amplitude ordinary and extraordinary ray pulses. Consequently, there emerged from the right-hand face of the element 212 four equal-amplitude pulses. These pulses are respectively directed along four spaced parallel modulation paths, each of which is adapted to have a different characteristic optical length. The uppermost or shortest one of these paths extends straight through a modulator unit MOD 1 to a third birefringent element 216 which, as will be described in more detail below, is disposed in a complementary manner with respect to the element 212 paired therewith. Each of the other three paths includes four fully reflecting mirrors and a modulator unit. Specifically, the second-from-the-top path includes fully-reflecting mirrors 220 through 223 and a modulator unit MOD 2. The next-to-the-bottom path includes fully reflecting mirrors 224 through 227 and a modulator unit MOD 3. The bottommost or longest path includes fully reflecting mirrors 228 through 231 and a modulator unit MOD 4.

The lengths of the optical paths that extend between the birefringent elements 212 and 216 are so proportioned that pulses simultaneously launched therealong from the element 212 arrive at the element 216 in a predetermined spaced-apart sequence. The character of the pulse train that impinges upon the element 216 is determined by the respective states of the modulator units MOD 1 through MOD 4. In turn, these units are controlled by electrical signals applied thereto by the information signal source 130. As in the embodiment of FIG. 1, the source 130 is gated by the control source 102.

As indicated above, the birefringent element 216 is disposed in a complementary position with respect to its paired element 212. More specifically, the element 216 is identical to the element 212 with the exception that the element 216 has been rotated 180 degrees about the normal to the left-hand or entry face thereof. As a result, the optic axis of the element 216 still makes an angle $\phi$ with the normal.

In accordance with the same general principles described above in connection with the operation of the paired elements 112 and 116 of FIG. 1, the element 216 of FIG. 2 responds to the pulses supplied thereto by the element 212 to combine them in a selective manner. In particular, the element 216 responds to the orthogonally polarized pulses propagated along the upper two paths 232 and 233 to route them to an output path 236. Similarly, the element 216 routes the orthogonally polarized pulses respectively propagated along the lower two paths 234 and 235 to a single output path 238.

Advantageously, polarizers 240 and 242 are interposed in the paths 236 and 238, respectively, to ensure that only the necessary polarization is present in each pulse directed at a fourth birefringent element 116 for proper recombination thereby along a single main output path 122. This fourth element 116 is identical to the element 116 shown in FIG. 1.

The polarizers 240 and 242 need not be included in the FIG. 2 arrangement. If they are not included, other output channels spatially displaced from the path 122 are present. However, such other channels can be easily discriminated against by arranging the device 124 to respond only to pulses propagated along the main output path 122.

In the absence of the application of energization potentials to the modulator units MOD 1 through MOD 4 of FIG. 2 (indicative of four "1" signals respectively supplied to the units by the source 130), four time-spaced pulses are supplied to the output utilization device 124. FIG. 3 illustrates this case. During the time interval designated $t_1$ through $t_5$ in FIG. 3, four "1" signals are applied to the modulator units from the source 130 in time coincidence with the application of a gating signal from the source 102 to the source 130. In response to such information signals, four spaced-apart pulses are delivered to the utilization device 124. The relative times of arrival of these pulses at the device 124 are indicated in rows 8 through 11 of FIG. 3. Row No. 12 is simply a composite depiction of the complete pulse train that is delivered to the device 124 during the time interval $t_1$ through $t_5$. It is noted that the first pulse (representative of the information signal I1) supplied to the device 124 arrives thereat after a transit time delay of $\Delta$ seconds relative to the leading edge of the original input signal supplied at time $t_1$ by the source 100.

During the time interval marked $t_{10}$ through $t_{14}$ in FIG. 3, the information signals respectively represented in rows 3 through 6 are applied to the modulator units MOD 1 through MOD 4 of FIG. 2. In response thereto, the pulses corresponding to the information signals I1 and I4 are routed to the output utilization device 124, whereas the pulses corresponding to the information signals I2 through I3 are not directed thereto. The resulting sequence of pulses actually delivered to the device 124 in the interval $t_{10}$ through $t_{14}$ is shown in row No. 12 of FIG. 3. As indicated in FIG. 3, this sequence is representative of the binary word 1001.

It is apparent from an inspection of the last row of FIG. 3 that the repetition rate of the narrow pulse sequences delivered to the device 124 is four times the rate at which pulses are generated by the signal source 100. As a result, the information-handling capacities of the optical sequences delivered to the device 124 are enhanced over the capacity inherent in the characteristic output pulses of the source 100. It is significant to note that this increase in capacity is achieved through the action of modulator units which, while individually operating at a maximum rate R, participate in the generation of an output pulse train having a rate 4R.

Thus, there have been described herein two specific exemplary assemblies which illustratively embody the principles of the present invention. As set forth above, each of these combinations responds to a single input optical pulse by generating a sequence of reduced-amplitude optical pulses suitable for efficient use in an optical information processing system.

It is to be understood that the above-described arrangements are only illustrative of the application of the principles of the present invention. In accordance with these principles, numerous other arrangements may be devised by those skilled in the art without departing from the spirit and scope of the invention. For example, although the modulator units included in the arrangements of FIGS. 1 and 2 are described above as being of the type that selectively control the polarization condition of pulses that propagate therethrough, it is, of course, feasible to substitute therefor modulator units that affect incident pulses in some other fashion. For instance, each such unit may comprise a conventional optical deflection device which when activated routes the propagation vector of the pulse propagated therethrough along a path that does not impinge upon the associated birefringent elements. As another example, the modulators may control the phase or the frequency of the pulses.

In addition, although emphasis above is directed to an output sequence comprising evenly spaced pulses, it is to be understood that the principles of the present invention are not restricted thereto. If desired, the various path lengths traversed by pulses can be proportioned such that the output pulses are not evenly spaced. Any desired pulse spacing can be achieved simply by selective positioning of the fully reflecting mirror members shown in FIGS. 1 and 2. Alternatively, the relative dimensioning of the illustrative assembly may be controlled by interposing electro-optic elements (not shown) in the various pulse propagation paths. By electrically varying the index of refraction of each such element, the effective path length of radiant energy propagated therethrough may be selectively and easily altered.

Also, it is to be understood that the principles of this invention are not limited to a pulse generator that includes four modulation channels. In accordance with the invention, the number of channels may be varied as desired to achieve any required multiplication of the natural repetition rate of the pulsed output of the signal source 100.

Additionally, it is emphasized that embodiments made in accordance with the principles of the present invention are not limited to including calcite therein. Any birefringent materials capable of splitting and recombining incident pulses in the manner described herein are suited for inclusion in such embodiments.

What is claimed is:
1. In combination in an optical pulse generator, first and second complementary-disposed birefringent elements positioned in spaced-apart relationship along a main axis of said generator, input means for directing a plane-polarized optical pulse at said first element along said axis, said plane of polarization being so oriented with respect to the plane containing the optic axis and the normal to the incident surface of said first element that said pulse is split by said first element into two equal-amplitude pulses which are propagated along spatially distinct first and second paths to said second element, means interposed in said first path for increasing the optical length thereof relative to the optical length of said second path, and two modulator units respectively interposed in said first and second paths, whereby a single input pulse is split by said first element into two equal-amplitude pulses that are respectively propagated along distinct modulation paths of different lengths to be subsequently recombined by said second element into a modulated serial output train of pulses along a single spatial path.

2. A combination as in claim 1 wherein said first and second elements comprise a calcite pulse splitter and a calcite pulse combiner, respectively.

3. A combination as in claim 2 wherein said increasing means includes fully reflecting mirror means disposed to route pulses along a circuitous path between said first and second elements.

4. A combination as in claim 3 further including an information signal source connected to said modulator units for respectively controlling the activation states thereof.

5. A combination as in claim 4 still further including $n$ additional pairs of complementary-disposed birefringent elements, the respective elements of each such additional pair being positioned along said main axis on either side of said first and second elements and in spaced-apart relationship therewith, the element of each such additional pair that is positioned between said first element and said input means being oriented with respect to the polarization condition of the optical pulses incident thereon to split each incident pulse into two equal reduced-amplitude orthogonally polarized pulses, whereby a single input pulse is split into $2^{n+1}$ equal-amplitude pulses that are respectively propagated along $2^{n+1}$ distinct paths.

6. A combination as in claim 5 wherein each of said $2^{n+1}$ paths additional to said aforementioned first and second paths includes fully reflecting mirror means interposed therein to route pulses along a circuitous path having a distinct characteristic optical path length.

7. A combination as in claim 6 wherein each of said $2^{n+1}$ paths additional to said aforementioned first and second paths has interposed therein a distinct modulator unit.

8. A combination as in claim 7 wherein said information signal source is connected to the modulator units in said additional paths to respectively control the activation states thereof.

References Cited

UNITED STATES PATENTS

| 2,745,316 | 5/1956 | Sziklai | 350—150 |
| 3,256,443 | 6/1966 | Moore | 250—199 |
| 3,297,876 | 1/1967 | De Maria | 250—199 |
| 3,302,027 | 1/1967 | Fried | 250—199 |

FOREIGN PATENTS

| 1,033,595 | 7/1953 | France. |

ROBERT L. GRIFFIN, *Primary Examiner.*

A. J. MAYER, *Assistant Examiner.*

U.S. Cl. X.R.

332—7.51; 350—169